US011960926B2

(12) United States Patent
Mohalik et al.

(10) Patent No.: US 11,960,926 B2
(45) Date of Patent: Apr. 16, 2024

(54) AUTOMATED PLAN SYNTHESIS AND ACTION DISPATCH

(71) Applicant: Telefonaktiebolaget LM Ericsson (publ), Stockholm (SE)

(72) Inventors: Swarup Kumar Mohalik, Bangalore Karnataka (IN); Senthamiz Selvi Arumugam, Solna (SE); Chakri Padala, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 327 days.

(21) Appl. No.: 17/272,465

(22) PCT Filed: Sep. 13, 2018

(86) PCT No.: PCT/IN2018/050593
§ 371 (c)(1),
(2) Date: Mar. 1, 2021

(87) PCT Pub. No.: WO2020/053871
PCT Pub. Date: Mar. 19, 2020

(65) Prior Publication Data
US 2021/0318906 A1 Oct. 14, 2021

(51) Int. Cl.
*G06F 9/48* (2006.01)
*G06F 9/50* (2006.01)
*G06N 20/00* (2019.01)

(52) U.S. Cl.
CPC ............ *G06F 9/4881* (2013.01); *G06F 9/505* (2013.01); *G06F 9/5083* (2013.01); *G06N 20/00* (2019.01)

(58) Field of Classification Search
CPC ...... G06F 9/4881; G06F 9/505; G06F 9/5083; G06N 20/00
See application file for complete search history.

(56) References Cited

U.S. PATENT DOCUMENTS

| | | | |
|---|---|---|---|
| 5,664,051 A * | 9/1997 | Hardwick | ............... G10L 19/02 704/E19.01 |
| 8,161,187 B2 | 4/2012 | Anderson et al. | |
| 8,239,828 B2 | 8/2012 | Liu et al. | |
| 8,250,355 B2 | 8/2012 | Eilam et al. | |
| 9,830,187 B1 | 11/2017 | Blaine et al. | |
| 2002/0076104 A1* | 6/2002 | Sun | ..................... G01B 9/02083 382/173 |
| 2002/0147579 A1* | 10/2002 | Kushner | ................. G10L 19/00 704/E15.047 |
| 2005/0171967 A1* | 8/2005 | Yuknewicz | ............... G06F 8/00 |
| 2007/0035978 A1* | 2/2007 | Newman | ................. H02M 1/36 363/148 |
| 2011/0019223 A1* | 1/2011 | Ocke | ..................... G06F 3/1275 358/1.15 |

(Continued)

*Primary Examiner* — Jorge A Chu Joy-Davila
(74) *Attorney, Agent, or Firm* — Murphy, Bilak & Homiller, PLLC

(57) ABSTRACT

An artificial intelligence, AI, planning controller control the timing of when a plan (16) to accomplish a task (14) is synthesized. The AI planning controller in this regard determines a quiescent phase (20) during which values of at least some predicates describing a state of the system (12) will remain stable. The AI planning controller then controls artificial intelligence planning to synthesize the plan (16) during at least some of the quiescent phase (20).

24 Claims, 13 Drawing Sheets

(56) References Cited

U.S. PATENT DOCUMENTS

| | | | |
|---|---|---|---|
| 2013/0274928 A1* | 10/2013 | Matsuoka | G05B 19/042 |
| | | | 700/276 |
| 2017/0116030 A1 | 4/2017 | Mealey et al. | |
| 2017/0277203 A1 | 9/2017 | Castillo-Effen et al. | |
| 2018/0165126 A1* | 6/2018 | McKenney | G06F 9/4887 |
| 2020/0311221 A1* | 10/2020 | Reddy | G06F 30/327 |

* cited by examiner

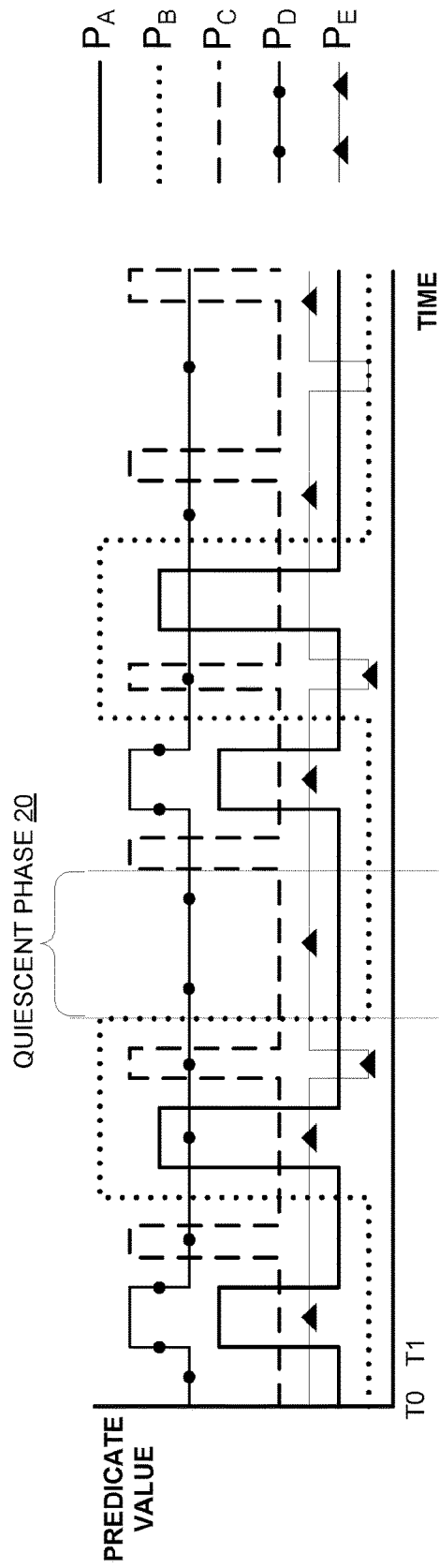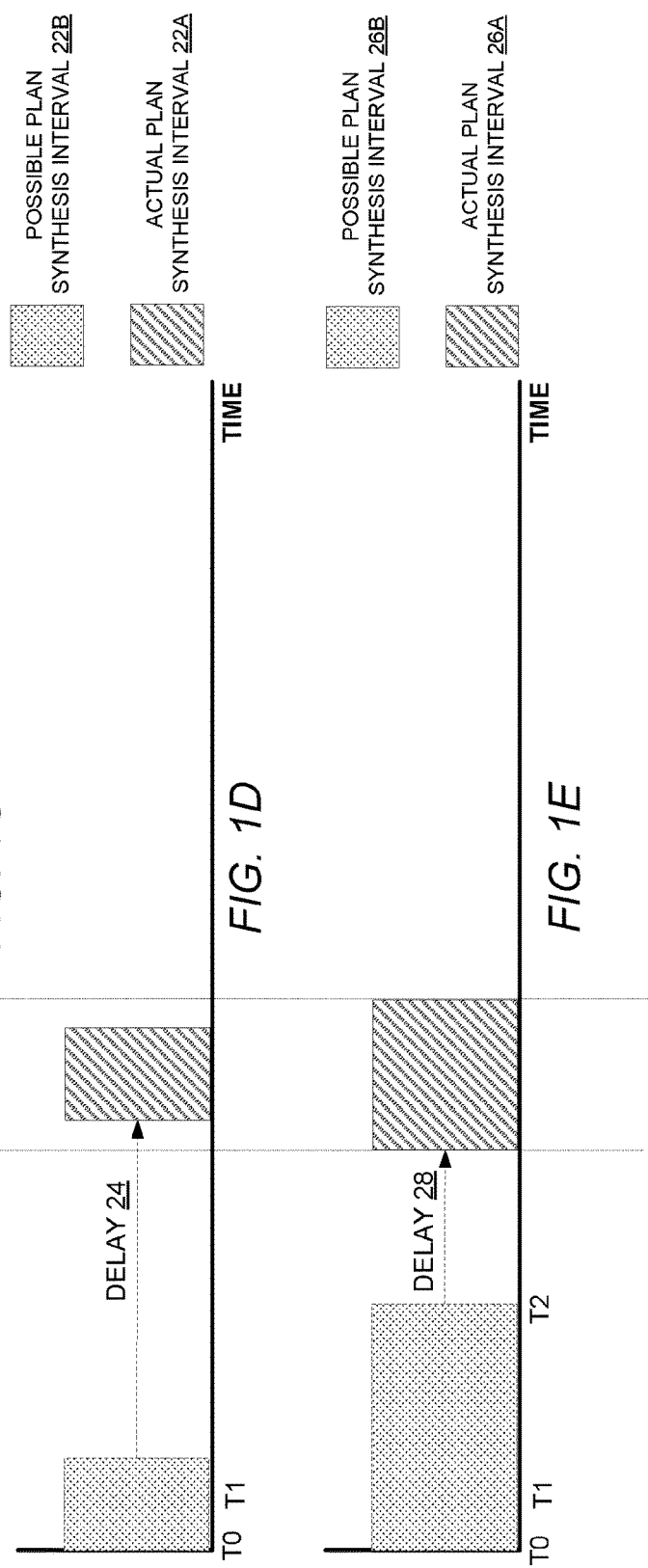
FIG. 1C
FIG. 1D
FIG. 1E

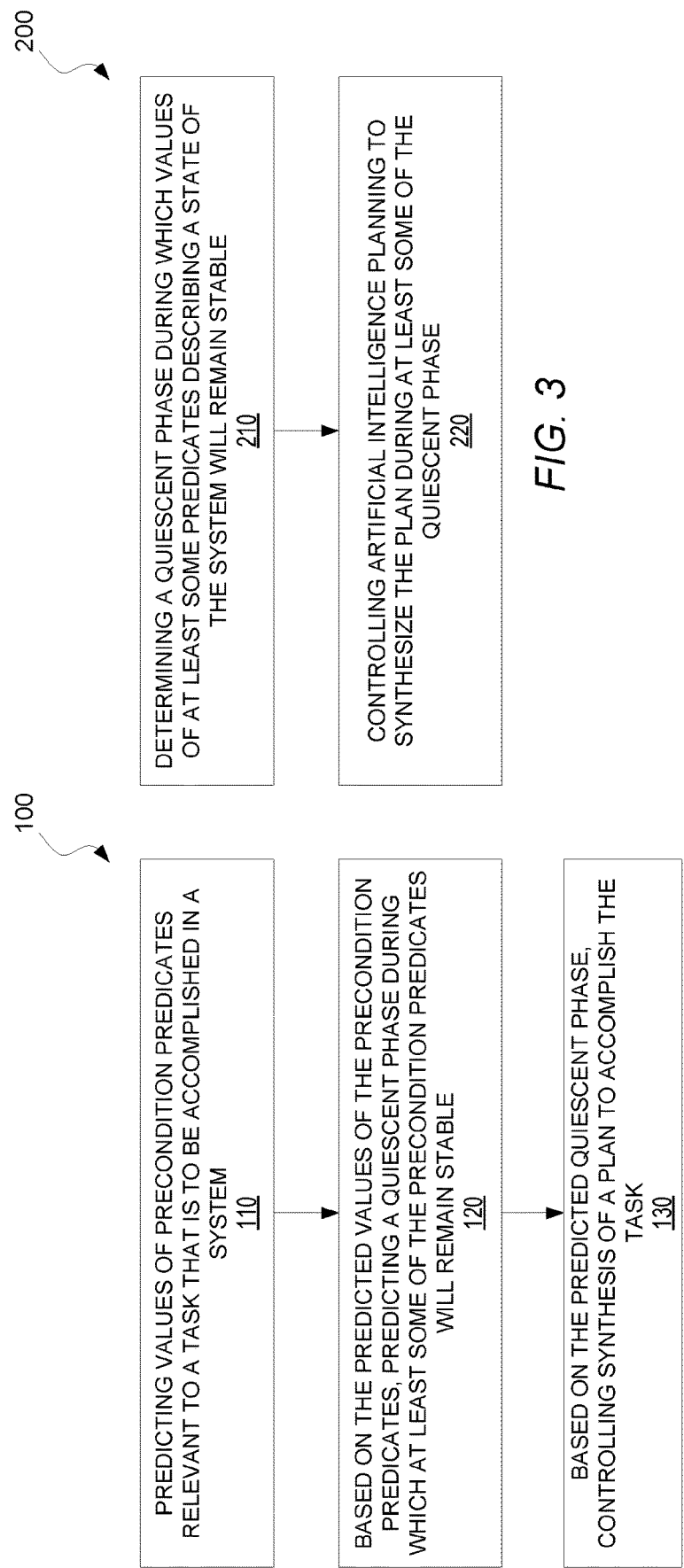

AUTOMATED PLAN SYNTHESIS AND ACTION DISPATCH

TECHNICAL FIELD

The present application relates generally to accomplishing a task in a system, and relates more specifically to automated synthesis of a plan to accomplish the task and dispatch of actions in the plan.

BACKGROUND

Automated planning is a branch of artificial intelligence that deals with the problem of finding a plan to accomplish a task in a system, e.g., an internet-of-things (IoT) system. Action-based formalism specifies the plan in terms of a set of actions, which may be at least partially ordered in a sequence, that will accomplish the task. After this plan is found, actions in the plan are dispatched for execution. Execution of the dispatched actions accomplishes the task and thereby transforms the system from some initial state to a desired goal state.

To synthesize the plan in an autonomous manner, plan synthesis must adapt to changes in the system, including for instance changes in the initiate state or desired goal state. Indeed, when changes in the system occur, those changes may justify or require changes in the plan. Similarly, actions in the plan must be dispatched in a timely manner in order for the plan's execution to succeed. Plan synthesis and action dispatch prove challenging, however, in real-time systems where successful task accomplishment is particularly sensitive to delays in plan synthesis and/or action dispatch.

SUMMARY

Some embodiments herein account for the real-time nature of a system when synthesizing a plan to accomplish a task in the system and/or when dispatching actions in the plan for execution. For example, some embodiments control the timing of plan synthesis to occur during a quiescent phase during which relevant states in the system are predicted to remain stable, e.g., so as to protect the plan against immediate staleness that could happen if system state changes occur while synthesizing the plan. Other embodiments strategically allocate control over action dispatch to distributed controllers that meet constraints on the delay with which they must dispatch control signalling for executing actions in the plan, e.g., so as to protect the plan from failed execution due to control signalling latency. These and other embodiments may therefore account for the practical reality that plan synthesis and/or action dispatch do not occur instantaneously, but instead occur over some duration of time. In accounting for real-time delays in plan synthesis and/or action dispatch, the embodiments may reduce the extent to which successful accomplishment of a task is sensitive to such delays.

More particularly, embodiments herein include a method for synthesizing a plan to accomplish a task in a system and for controlling the dispatch of actions in the plan. The plan comprises a set of actions for accomplishing the task in the system. The method comprises determining a quiescent phase during which values of at least some predicates describing a state of the system will remain stable. The method also comprises controlling artificial intelligence planning to synthesize the plan during at least some of the quiescent phase. The method may further comprises identifying multiple candidate dispatch controllers that are candidates for controlling dispatch of a first action in the plan. The method in this case may also comprise determining, for each of the candidate dispatch controllers, a communication latency with which control signalling is able to be communicated via the candidate dispatch controller for dispatching a second action in the plan after execution of the first action. The method may then comprise selecting, from among the candidate dispatch controllers, a first dispatch controller whose determined communication latency satisfies a dispatch delay constraint governing dispatch of the second action. The method may next comprise allocating the first action to the first dispatch controller.

Embodiments herein also include a method of controlling when artificial intelligence planning synthesizes a plan to accomplish a task in a system. The method comprises determining a quiescent phase during which values of at least some predicates describing a state of the system will remain stable. The method also comprises controlling artificial intelligence planning to synthesize the plan during at least some of the quiescent phase.

In either of these methods, controlling AI planning may comprise delaying synthesis of the plan until at least some of the synthesis will occur during the quiescent phase. Alternatively or additionally, controlling AI planning may comprise delaying synthesis of the plan until at least some of the synthesis will occur during the quiescent phase, subject to a constraint that the task or the synthesis must start or end by a certain deadline.

In some embodiments, the method may further comprise, responsive to determining that no quiescent phase is predicted to naturally occur, driving the system into the quiescent phase by controlling execution of a set of one or more waypoint actions.

In some embodiments, the quiescent phase is a phase during which values of precondition predicates relevant to the task will remain stable. In one such embodiment, determining the quiescent phase comprises predicting the quiescent phase based on predicted values of the precondition predicates relevant to the task.

In some embodiments, controlling AI planning may comprise controlling, based on a duration of the quiescent phase, a length of an interval over which the plan is to be synthesized.

Embodiments herein also include a method of controlling the dispatch of actions in a plan for accomplishing a task in a system. The method may comprises identifying multiple candidate dispatch controllers that are candidates for controlling dispatch of a first action in the plan. The method in this case may also comprise determining, for each of the candidate dispatch controllers, a communication latency with which control signalling is able to be communicated via the candidate dispatch controller for dispatching a second action in the plan after execution of the first action. The method may then comprise selecting, from among the candidate dispatch controllers, a first dispatch controller whose determined communication latency satisfies a dispatch delay constraint governing dispatch of the second action. The method may next comprise allocating the first action to the first dispatch controller.

In some embodiments, a first resource in the system is configured to execute the first action, and the dispatch delay constraint specifies a maximum allowable delay between when the first resource completes execution of the first action and when a second resource in the system receives control signaling from a second dispatch controller indicating that the second action is to be dispatched.

In some embodiments, determining the communication latency may comprise determining, for each of the candidate dispatch controllers, a communication latency metric indicating the communication latency with which control signalling is able to be communicated via the candidate dispatch controller for dispatching the second action. The communication latency metric for each candidate dispatch controller may be a function of (e.g., a sum of): a first communication latency between a first resource configured to execute the first action and the candidate dispatch controller that is to receive control signaling from the first resource indicating that the first resource has completed execution of the first action; a second communication latency between the candidate dispatch controller and a second dispatch controller that is to receive control signaling from the candidate dispatch controller indicating that the second action is to be dispatched; and a third communication latency between the second dispatch controller and a second resource that is to execute the second action responsive to receiving control signaling from the second dispatch controller indicating that the second action is to be dispatched.

In some embodiments, at least some of the dispatch controllers are geographically distributed in the system.

In some embodiments, said identifying, selecting, and allocating are performed as part of allocating pairs of consecutive actions in the plan to respective pairs of dispatch controllers such that each pair of dispatch controllers to which a pair of actions is allocated is able to dispatch control signaling for consecutive execution of the actions with communication latency that satisfies a dispatch delay constraint for the pair of actions.

In some embodiments, said identifying, selecting, and allocating are dynamically performed as needed to account for changes in a state of the system.

Embodiments herein also include a method for artificial intelligence planning. The method comprises predicting values of precondition predicates relevant to a task that is to be accomplished in a system. The method also comprises, based on the predicted values of the precondition predicates, predicting a quiescent phase during which at least some of the precondition predicates will remain stable. The method may further comprise, based on the predicted quiescent phase, controlling synthesis of a plan to accomplish the task.

In some embodiments, predicting the quiescent phase comprises determining the quiescent phase as an interval of time during which the predicted values of the precondition predicates will not change.

In any of the above methods, the system may be a cyber-physical system or an internet-of-things system.

Embodiments herein also include corresponding apparatus, computer programs, and carriers.

For example, embodiments herein include a system-level controller configured to synthesize and execute a plan to accomplish a task in a system. The plan comprises a set of actions for accomplishing the task in the system. The system-level controller comprises an artificial intelligence planning controller and a dispatch allocation controller. The artificial intelligence planning controller is configured (e.g., via processing circuitry) to determine a quiescent phase during which values of at least some predicates describing a state of the system will remain stable, and control artificial intelligence planning to synthesize the plan during at least some of the quiescent phase. The dispatch allocation controller is configured (e.g., via processing circuitry) to identify multiple candidate dispatch controllers that are candidates for controlling dispatch of a first action in the plan and determine, for each of the candidate dispatch controllers, a communication latency with which control signalling is able to be communicated via the candidate dispatch controller for dispatching a second action in the plan after execution of the first action. The dispatch allocation controller is also configured to select, from among the candidate dispatch controllers, a first dispatch controller whose determined communication latency satisfies a dispatch delay constraint governing dispatch of the second action, and allocate the first action to the first dispatch controller.

Embodiments also include the AI planning controller individually and the dispatch allocation controller individually.

BRIEF DESCRIPTION OF THE DRAWINGS

FIG. 1C is a timing diagram of predicted values of predicates describing a state of a system, and a quiescent phase, according to some embodiments.

FIG. 1D is a timing diagram depicting the timing of plan synthesis to occur in a quiescent phase according to some embodiments.

FIG. 1E is a timing diagram depicting the timing of plan synthesis to occur in a quiescent phase according to other embodiments.

FIG. 2 is a method performed by an artificial intelligence planning controller according to some embodiments.

FIG. 3 is a method performed by an artificial intelligence planning controller according to other embodiments.

DETAILED DESCRIPTION

Figure 1A:
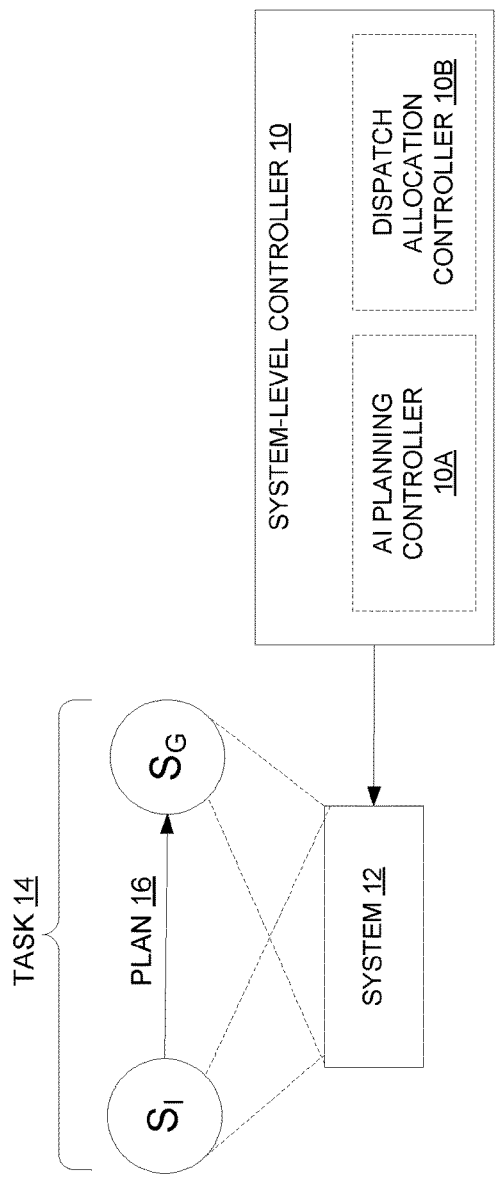
FIG. 1A is a block diagram of a system and a system-level controller according to some embodiments.

FIG. 1A shows a system-level controller 10 according to some embodiments. The system-level controller 10 controls a system 12, e.g., an internet-of-things (IoT) system or a cyber-physical system. The system-level controller 10 in this regard decides that a task 14 is to be accomplished in the system 12. Accomplishing this task 14 changes the system's state from an initial state $S_I$ to a desired goal state $S_G$. The system-level controller 10 not only decides that the task 14 is to be accomplished, but also decides how the task 14 is to be accomplished. The system-level controller 10 accordingly synthesis a plan 16 to accomplish the task 14. This plan 16 includes a set of actions that are to be executed for accomplishing the task 14.

Figure 1B:
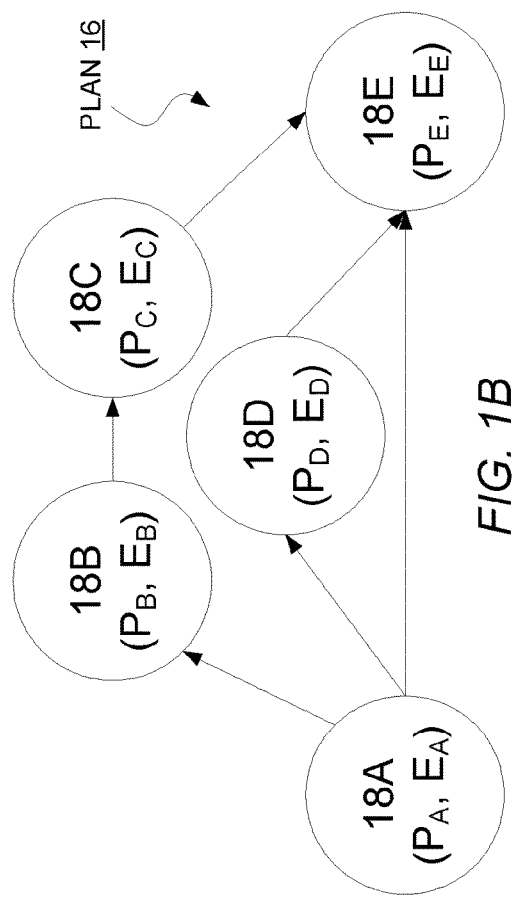
FIG. 1B is a block diagram of a plan to accomplish a task in a system according to some embodiments.

FIG. 1B shows one example of embodiments where this plan 16 is synthesized in terms of a certain set of basic or atomic actions to be executed by devices or other resources in the system 12. The plan 16 as shown in this example includes a set of actions 18A-18E, e.g., in the form of a directed acyclic graph (DAG) of actions. The actions 18A-18E in the set may be at least partially ordered, e.g., so as to constitute an at least partially ordered sequence of actions. Each action is basic or atomic in the sense that it is defined by a pair of predicates which capture the state of the system 12 before and after the action is executed. This pair of predicates includes a precondition P and an effect E. The precondition P models the state of the system 12 that is required for the action to be performed. The effect E models the change in the system's state after the action has been performed. As shown in FIG. 1, for example, action 18A is defined as the combination of precondition $P_A$ and the effect $E_A$, i.e., Action 18A=$(P_A, E_A)$. Similarly, action 18B=$(P_B, E_B)$, action 18C=$(P_C, E_C)$, action 18D=$(P_D, E_D)$, and action 18E=$(P_E, E_E)$.

According to some embodiments, the system manger 10 accounts for the real-time nature of the system 12 by accounting for the impact that system state changes could have on the synthesis of the plan 16. The system-level controller 10 in this regard includes an artificial intelligence (AI) planning controller 10A that times synthesis of the plan 16 to occur during predicted stability of the values of at least some predicates describing a state of the system 12. This advantageously protects the plan 16 against immediate staleness that could occur if system state changes were to occur during the non-instantaneous time interval over which the plan 16 is synthesized. FIG. 1C illustrates additional details of how the AI planning controller 10A times plan synthesis according to some embodiments.

As shown in FIG. 1C, the AI planning controller 10A predicts the future values of certain predicates describing a state of the system 12, e.g., based on the historical behaviour or trend of those predicates. The certain predicates in this regard may be those predicates that are or are predicted as being relevant to the task 14. FIG. 1C depicts these predicates as the preconditions $P_A$-$P_E$ that must be met in order for the actions 18A-18E to be performed, respectively. Indeed, if the values of these preconditions $P_A$-$P_E$ for the actions 18A-18E were to change during synthesis of the plan 16, the plan 16 may be stale and unviable immediately upon its synthesis. To guard against this, the AI planning controller 10A determines a so-called quiescent phase 20. During this quiescent phase 20, the predicted values of the preconditions $P_A$-$P_E$ will remain stable; that is, the predicted values do not change or fluctuate over the course of the quiescent phase 20, or do not change or fluctuate more than a threshold amount tolerated over the course of the quiescent phase 20. The AI planning controller 10A then controls AI planning to synthesize the plan 16 during at least some of the quiescent phase 20.

As shown in FIG. 1D, for instance, the AI planning controller 10A may direct that the plan 16 be synthesized during an interval 22A of time that is entirely included within the quiescent phase 20. In some embodiments, the AI planning controller 10A may direct the plan 16 to be synthesized in this way even if it was possible for plan synthesis to have occurred earlier in time. In the example of FIG. 1D, for instance, it was possible for the plan 16 to have been synthesized during an interval 22B of time that starts at time T0. But, based on predicting that the values of the preconditions $P_A$-$P_E$ will change during that interval 22B (at time T1), the AI planning controller 10A delays 24 plan synthesis until the interval 22A that is included in the quiescent phase 20, so that the synthesis will occur during that quiescent phase 20.

In some embodiments, like the one shown in FIG. 1D, the AI planning controller 10A is able to identify a quiescent phase 20 with a duration that is at least as long as the interval 22A which will be needed for plan synthesis. In other embodiments, though, where the values of the relevant predicates fluctuate more frequently, the AI planning controller 10A may not be able to identify as long of a quiescent phase 20. In these and other embodiments, then, the AI planning controller 10A may tolerate at least some plan synthesis occurring outside of the quiescent phase 20, such that the interval of time over which plan synthesis occurs is only partially coincident with the quiescent phase 20. Alternatively or additionally, the AI planning controller 10A may control the length of the interval over which the plan is to be synthesized, based on the duration of the quiescent phase 20. For example, the AI planning controller 10A may shorten the length of the interval over which the plan is to be synthesized, e.g., as compared to the length that would have been permitted or tolerated otherwise, so that all of or at least more of plan synthesis will occur during the quiescent phase 20.

FIG. 1E shows one example in this regard. As shown, it was possible for the plan 16 to have been synthesized during an interval 26B of time that starts at time T0 and lasts until time T2. But, based on predicting that the values of the preconditions $P_A$-$P_E$ will change during that interval 26B (at time T1) and based on determining that the quiescent phase 20 identified is shorter than the interval 26B, the AI planning controller 10A delays 28 plan synthesis until an interval 26A that is the same as (i.e., entirely included in) the quiescent phase 20. That is, the AI planning controller 10A not only delayed plan synthesis but also shortened the length of the interval 26A over which plan synthesis is allowed to occur, so that plan synthesis will not occur outside of the quiescent phase 20. The quiescent phase 20 in this case may effectively operate as a constraint on the duration over which plan synthesis is to occur.

In some embodiments not shown, though, a constraint governs the minimum interval over which plan synthesis must occur. This constraint may prevent the plan synthesis interval from being shortened to fit within the quiescent phase, i.e., if the minimum interval is longer than the quiescent phase 20. In this case, the AI planning controller 10A in some embodiments shortens the plan synthesis interval as much as possible, i.e., to the minimum interval, such that as much plan synthesis as possible occurs during the quiescent phase 20.

Alternatively or additionally, a constraint may govern when the task 14 or plan synthesis must start or end. That is, there may be a certain deadline at which the task 14 or plan synthesis must start or end. In these embodiments, the AI planning controller 10A may adjust the timing of plan synthesis as much as possible while still complying with this constraint and/or other constraints, so that at least some of the synthesis will occur during the quiescent phase 20. For example, the AI planning controller 10A may delay synthesis of the plan 16 until at least some of the synthesis will occur during the quiescent phase 20, subject to the constraint that the task 14 or the synthesis must start or end by a certain deadline. Accordingly, where the certain deadline falls before the end of the quiescent phase 20, the interval during which the plan 16 is synthesized may be only partially coincident with the quiescent phase 20.

Regardless of the particular degree to which the AI planning controller 10A is able to time plan synthesis to occur during the quiescent phase 20, the quiescent phase 20 as described above may be quiescent in the sense that the values of at least some predicates describing a state of the system 12 (e.g., those predicates relevant to the task 14) do not change or fluctuate over the course of the quiescent phase 20. In some embodiments, a quiescent phase 20 is only identifiable if the values of at least some predicates remain stable for at least a minimum duration, i.e., such that the quiescent phase 20 is required to have at least a minimum duration. This minimum duration in one or more embodiments may be dynamically adapted based on the expected duration of plan synthesis.

Regardless, in some embodiments, the AI planning controller 10A may determine that no quiescent phase is predicted to "naturally" occur (i.e., without intervention), at least one that will occur by the time plan synthesis needs to occur to meet any deadlines for task completion. For example, the AI planning controller 10 may predict that the values of the predicates will change so often that they will not remain stable for at least the minimum required duration that a quiescent phase 20 must have. In these and other embodiments, though, the AI planning controller 10A may be configured to nonetheless drive the system 12 into the quiescent phase 20, e.g., drive the system 12 into a state from which the predicted values of the predicates will not change as often.

More particularly in this regard, the AI planning controller 10A may drive the system 12 into the quiescent phase 20 by controlling the execution of a set of one or more so-called waypoint actions. Execution of this set of one or more waypoint actions effectively forces the system 12 into a special type of quiescent phase (referred to as a waypoint) in which the system state does not change absent explicit triggering or other intervention. Execution of the set of one or more waypoint actions therefore essentially puts the system 12 into a sort of "stop" mode, implying the interruption of current activities in the system 12 and the loss of some functionality, in favor of a stable plan synthesis opportunity. Accordingly, the AI planning controller 10A in some embodiments only resorts to waypoints when it cannot exploit naturally occurring quiescent phases for stable plan synthesis opportunities. In this way, the AI planning controller 10A may advantageously preserve ongoing system activities and functionality so as to allow continuous operation in real-time systems, while still protecting plan synthesis against staleness using naturally occurring stable synthesis opportunities.

In view of the above modifications and variations, FIG. 2 illustrates a method 100 for artificial intelligence planning according to some embodiments. The method 100 may be performed for instance by the system-level controller 10 or the AI planning controller 10A in particular. The method 100 as shown includes predicting values of precondition predicates (e.g., $P_A$-$P_E$) relevant to a task 14 that is to be accomplished in a system 12 (Block 110). Such prediction may for instance be performed based on the historical behaviour or trend of those predicates. Regardless, the method 100 further includes, based on the predicted values of the precondition predicates, predicting a quiescent phase 20 during which at least some of the precondition predicates will remain stable (Block 120). This may involve determining the quiescent phase 20 as an interval of time during which the predicted values of the precondition predicates will not change. In any event, the method 100 in some embodiments may further include, based on the predicted quiescent phase 20, controlling synthesis of a plan 16 to accomplish the task 14 (Block 130). In some embodiments, for instance, such control may include controlling the timing of when synthesis of the plan 16 occurs.

FIG. 3 for example illustrates a method 200 of controlling when artificial intelligence planning synthesizes a plan 16 to accomplish a task 16 in a system 12 according to other embodiments. The method 200 may be performed for instance by the system-level controller 10 or the AI planning controller 10A in particular. The method 200 as shown includes determining a quiescent phase 20 during which values of at least some predicates (e.g., precondition predicates) describing a state of the system 12 will remain stable (Block 210). Such determining may be performed as described above with respect to FIG. 2, e.g., by predicting values of the predicates and predicting based on the predicted values when a quiescent phase will naturally occur without intervention. Regardless, the method 200 as shown also includes controlling artificial intelligence planning to synthesize the plan 16 during at least some of the quiescent phase 20 (Block 220). Such control may for instance involves delaying synthesis of the plan 16 until at least some of the synthesis will occur during the quiescent phase 20. Alternatively or additionally, such control may involve controlling, based on a duration of the quiescent phase, a length of an interval over which the plan 16 is to be synthesized.

While the above-described embodiments account for the real-time nature of the system 12 when synthesizing the plan 16, other embodiments herein alternatively or additionally account for the real-time nature of the system 12 when dispatching actions in the plan 16. These other embodiments may for instance account for the practical delay that occurs between when actions in the plan 16 are able to be dispatched for execution.

Figure 4A:
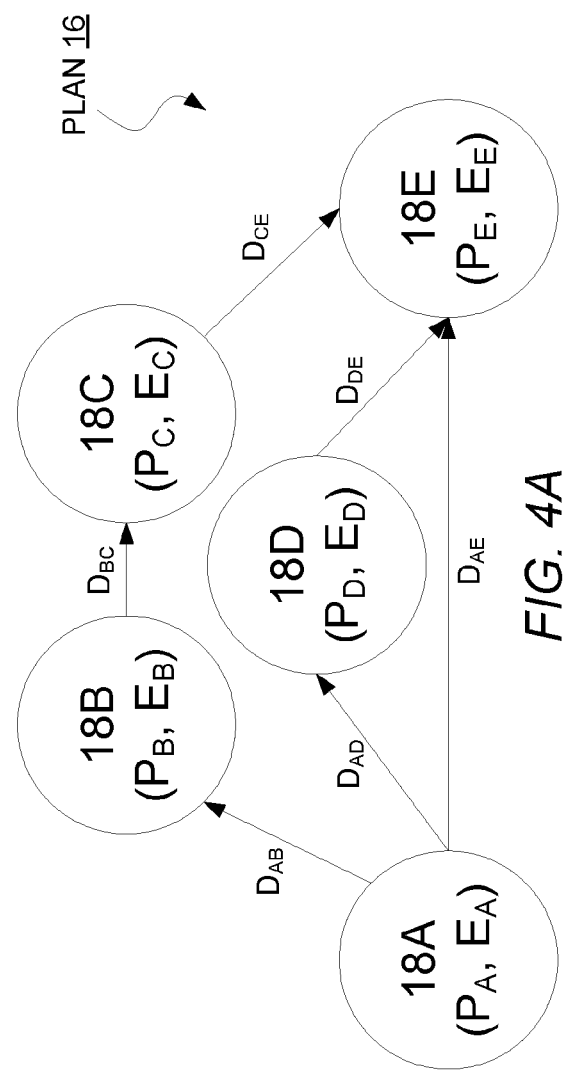
FIG. 4A is a block diagram of a plan to accomplish a task in a system, along with dispatch delay constraints for respective actions in the plan, according to some embodiments.

FIG. 4A in this regard shows the plan 16 where constraints govern the delay allowed between when actions in the plan 16 are dispatched. The delay between when action 18A completes execution and when action 18B is dispatched for execution must satisfy dispatch delay constraint $D_{AB}$ (which may be specified in terms of a number of time units, e.g., 5 ms). Similarly, the delay between when action 18B completes execution and when action 18C is dispatched for execution must satisfy dispatch delay constraint $D_{BC}$. And so on.

Figure 4B:
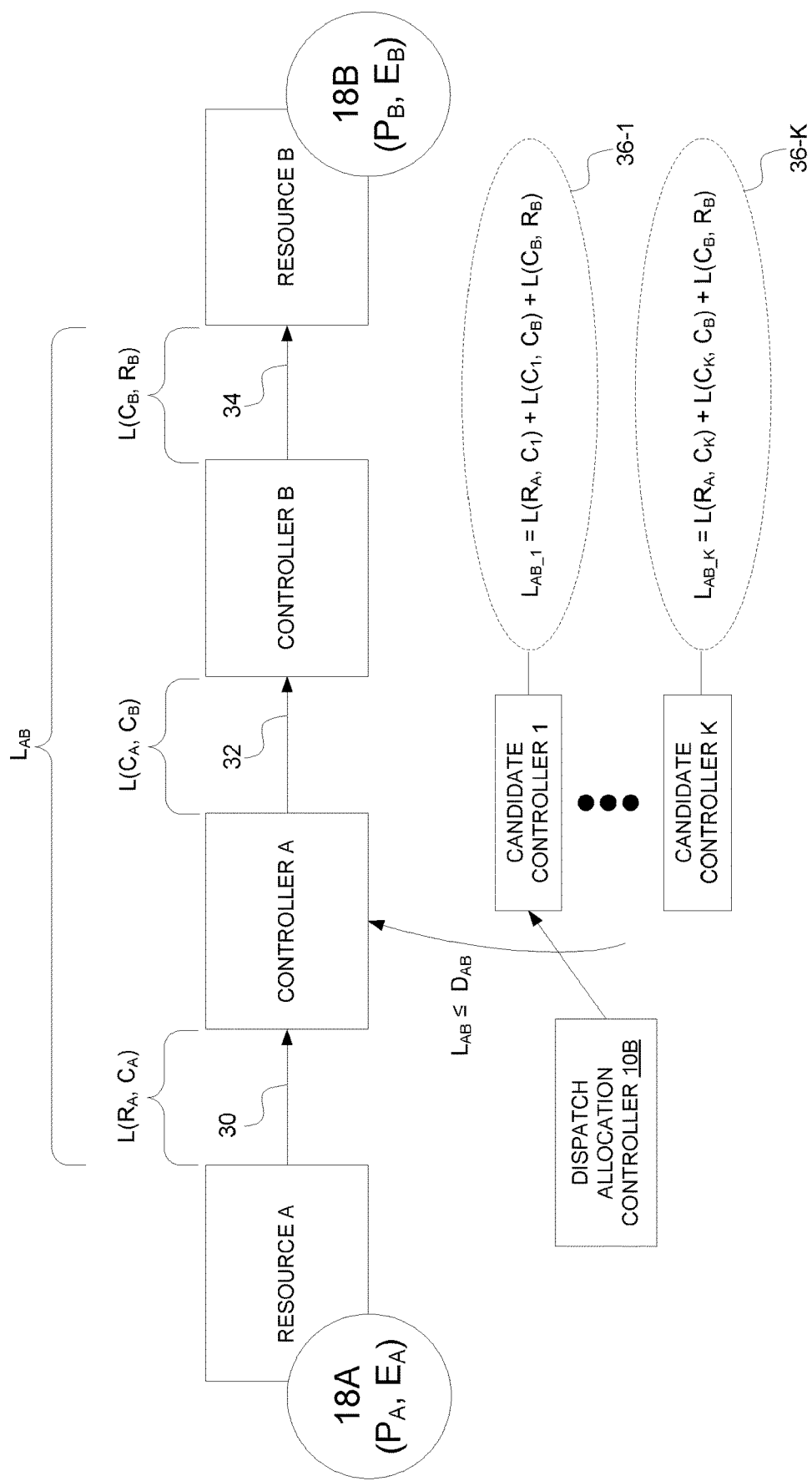
FIG. 4B is a block diagram of dispatch controller selection based on communication latency according to some embodiments.

Some embodiments herein recognize and account for the fact that action display delay is attributable, at least in part, to communication latency between controllers that control action dispatch. These embodiments may strategically allocate control over action dispatch to controllers that meet relevant constraints on the delay with which they must dispatch control signalling for executing actions in the plan 16, e.g., so as to protect the plan from failed execution due to control signalling latency. FIG. 4B illustrates additional details of some embodiments with respect to actions 18A and 18B.

As shown in FIG. 4B, Resource A is the resource (e.g., device) in the system 12 that actually executes action 18A, and Resource B is the resource (e.g., device) in the system 12 that actually executes action 18B. Controller A is the controller that controls the dispatch of action 18A for execution by Resource A, and Controller B is the controller that controls the dispatch of action 18B for execution by Resource B. When Resource A completes execution of action 18A in this regard, Resource A sends control signalling 30 (e.g., in the form of an action complete message) to Controller A to indicate that action 18A has been completed. Controller A in turn sends control signalling 32 (e.g., in the form of an action dispatch message) to Controller B to command or request that action 18B be dispatched. Controller B in response sends control signalling 34 (e.g., in the form of an action dispatch message) to Resource B to command or request that action 18B be executed by Resource B. In this case, the dispatch delay constraint $D_{AB}$ may specify a maximum allowable delay between when Resource A completes execution of action 18A and when Resource B receives control signalling 34 from Controller B indicating that action 18B is to be executed.

The latency incurred in sending control signalling 30 from Resource A to Controller A depends on the communication latency $L(R_A, C_A)$ between Resource A and Controller A. The latency incurred in sending control signaling 32 from Controller A to Controller B depends on the communication latency $L(C_A, C_B)$ between Controller A and Controller B. And the latency incurred in sending control signaling 34 from Controller B to Resource B depends on the communication latency $L(C_B, R_B)$ between Controller B and Resource B. The total latency $L_{AB}$ incurring in communicating the control signalling 30, 32, and 34 for the dispatch of action 18B in this way is equal to (or is a function of) the cumulative latency; that is, $L_{AB}=f(L(R_A, C_A)+L(C_A, C_B)+L(C_B, R_B))$.

According to some embodiments, multiple different controllers 1 . . . K are able to serve as Controller A. The different controllers 1 . . . K may for instance each be configured to control dispatch of action 18A, despite at least some of the controllers 1 . . . K being deployed at different geographic locations in the system 12, e.g., at Resource A itself, in the "cloud", or at the so-called "edge" between the resource tier of the system 12 and the cloud. Especially where at least some of the controllers 1 . . . K are deployed at different geographic locations, those controllers 1 . . . K may be associated with different communication latencies for communicating control signalling 30, 32, 34.

The system-level controller 10 according to some embodiments in this regard includes a dispatch allocation controller 10B. As shown in FIG. 4B, the dispatch allocation controller 10B selects, from among the different controllers 1 . . . K as candidates, which controller is to serve as Controller A, i.e., so as to control dispatch of action 18A. The dispatch allocation controller 10B notably selects whichever candidate controller allows action 18B to be dispatched within the dispatch delay constraint $D_{AB}$, accounting for the communication latency attributable to that controller. As shown in FIG. 4B, for example, the dispatch allocation controller 18B may select whichever candidate controller enables the control signalling 30, 32, and 34 to be communicated for dispatching action 18B with a communication latency $L_{AB}$ that satisfies the dispatch delay constraint $D_{AB}$, e.g., $L_{AB} \leq D_{AB}$.

In some embodiments, the dispatch allocation controller 18B performs this selection based on communication latency metrics calculated or otherwise determined for each candidate controller 1 . . . K. The communication latency metric for a candidate dispatch controller indicates the communication latency with which control signalling 30, 32, and 34 is able to be communicated via that candidate dispatch controller for dispatching action 18B. As shown in FIG. 4B, for example, the dispatch allocation controller 18B determines for candidate dispatch controller 1 a communication latency metric $L_{AB\_1}=L(R_A, C_1)+L(C_1, C_B)+L(C_B, R_B)$, where $L(R_A, C_1)$ is the communication latency between Resource A and candidate dispatch controller 1, $L(C_1, C_B)$ is the communication latency between candidate dispatch controller 1 and Controller B, and $L(C_B, R_B)$ is the communication latency between candidate dispatch Controller B and Resource B. Similarly, the dispatch allocation controller 18B determines for candidate dispatch controller K a communication latency metric $L_{AB\_K}=L(R_A, C_K)+L(C_K, C_B)+L(C_B, R_B)$, where $L(R_A, C_K)$ is the communication latency between Resource A and candidate dispatch controller K, $L(C_K, C_B)$ is the communication latency between candidate dispatch controller K and Controller B, and $L(C_B, R_B)$ is the communication latency between candidate dispatch Controller B and Resource B. The dispatch allocation controller 18B may compare the communication latency metrics $L_{AB\_1}$ . . . $L_{AB\_K}$ determined for the candidate dispatch controllers 1 . . . K to one another and/or to the dispatch delay constraint $D_{AB}$, so as to for instance select a candidate dispatch controller whose determined communication latency metric satisfies the dispatch delay constraint $D_{AB}$, e.g., $L_{AB} \leq D_{AB}$ where $L_{AB}$ is one of the communication latency metrics $L_{AB\_1}$ . . . $L_{AB\_K}$.

No matter the particular way in which the dispatch allocation controller 10B selects which candidate controller 1 . . . K is to serve as Controller A for action 18A, the dispatch allocation controller 10B allocates action 18A to the selection controller. Once the action 18A is allocated to the selected controller, that controller controls dispatch of action 18A. This may include not only sending control signaling to Resource A to indicate that action 18A is to be dispatched, but also receiving control signaling from Resource A indicating that execution of action 18A has been completed.

Note that although FIG. 4B illustrated embodiments herein with respect to selection of a dispatch controller for controlling dispatch of one action 18A in the plan 16, the dispatch allocation controller 10B may select a dispatch controller for controller dispatch of action 18B in a similar way, i.e., for selecting Controller B. The same may be said for other actions in the plan 16. In fact, in some embodiments, the dispatch allocation controller 10B performs the selection described above as part of selecting respective dispatch controllers for multiple actions (e.g., all actions) in the plan 16. For instance, in some embodiments, the dispatch allocation controller 10B performs the selection described above as part of allocating pairs of consecutive actions in the plan (e.g., actions 18A and 18B) to respective pairs of dispatch controllers, such that each pair of dispatch controllers to which a pair of actions is allocated is able to dispatch control signaling for consecutive execution of the actions with communication latency that satisfies a dispatch delay constraint for the pair of actions. In this case, then, the dispatch allocation controller 10B may jointly select the dispatch controllers that are to control respective actions in a pair. With respect to actions 18A and 18B, for instance, the dispatch allocation controller 10B may jointly select Controller A and Controller B for controlling dispatch of actions 18A and 18B.

Note also that the dispatch allocation controller 10B according to some embodiments may dynamically perform or update dispatch controller selection or allocation on an as-needed basis, e.g., as needed to account for changes the plan 16 and/or changes in a state of the system 12.

Figure 5:
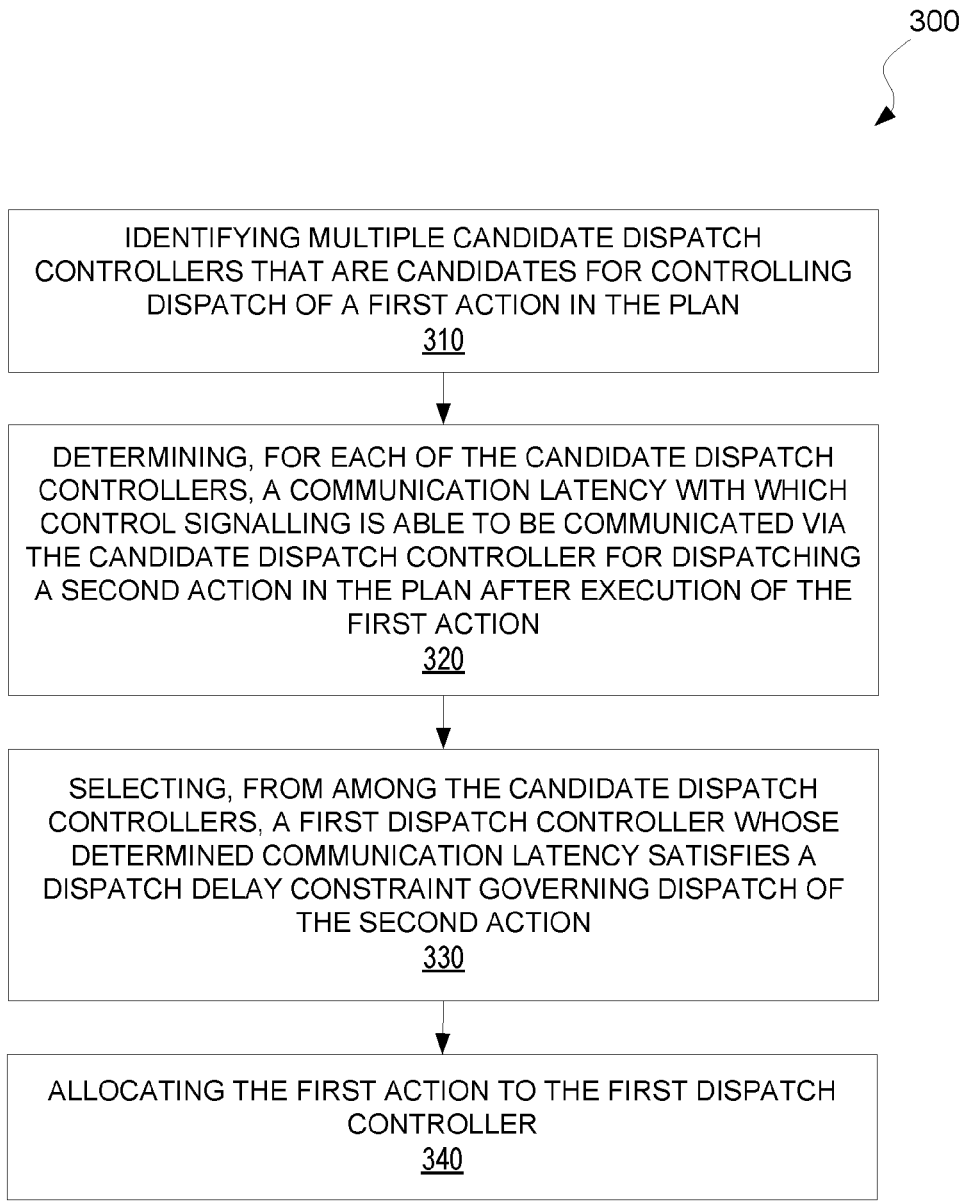
FIG. 5 is a logic flow diagram of a method performed by a dispatch allocation controller according to some embodiments.

In view of the above modifications and variations, FIG. 5 shows a method 300 of controlling the dispatch of actions in a plan 16 for accomplishing a task 16 in a system 12 according to some embodiments. The method 300 includes identifying multiple candidate dispatch controllers that are candidates for controlling dispatch of a first action (e.g., action 18A) in the plan 16 (Block 310). The method 300 also includes determining, for each of the candidate dispatch controllers, a communication latency with which control signalling is able to be communicated via the candidate dispatch controller for dispatching a second action (e.g., action 18B) in the plan 16 after execution of the first action (Block 320). The method 300 then includes selecting, from among the candidate dispatch controllers, a first dispatch controller (e.g., Controller A) whose determined communication latency satisfies a dispatch delay constraint governing dispatch of the second action (Block 330). The method 300 in some embodiments further includes allocating the first action to the first dispatch controller (Block 340).

Note that the embodiments in FIGS. 4A-4B and 5 may be implemented separately or in combination with the embodiments in FIGS. 1C-1E and 2-3. That is, the system-level controller 10 in FIG. 1A may include one or both of the AI planning controller 10A and the dispatch allocation controller 10B as described above.

Figure 6:
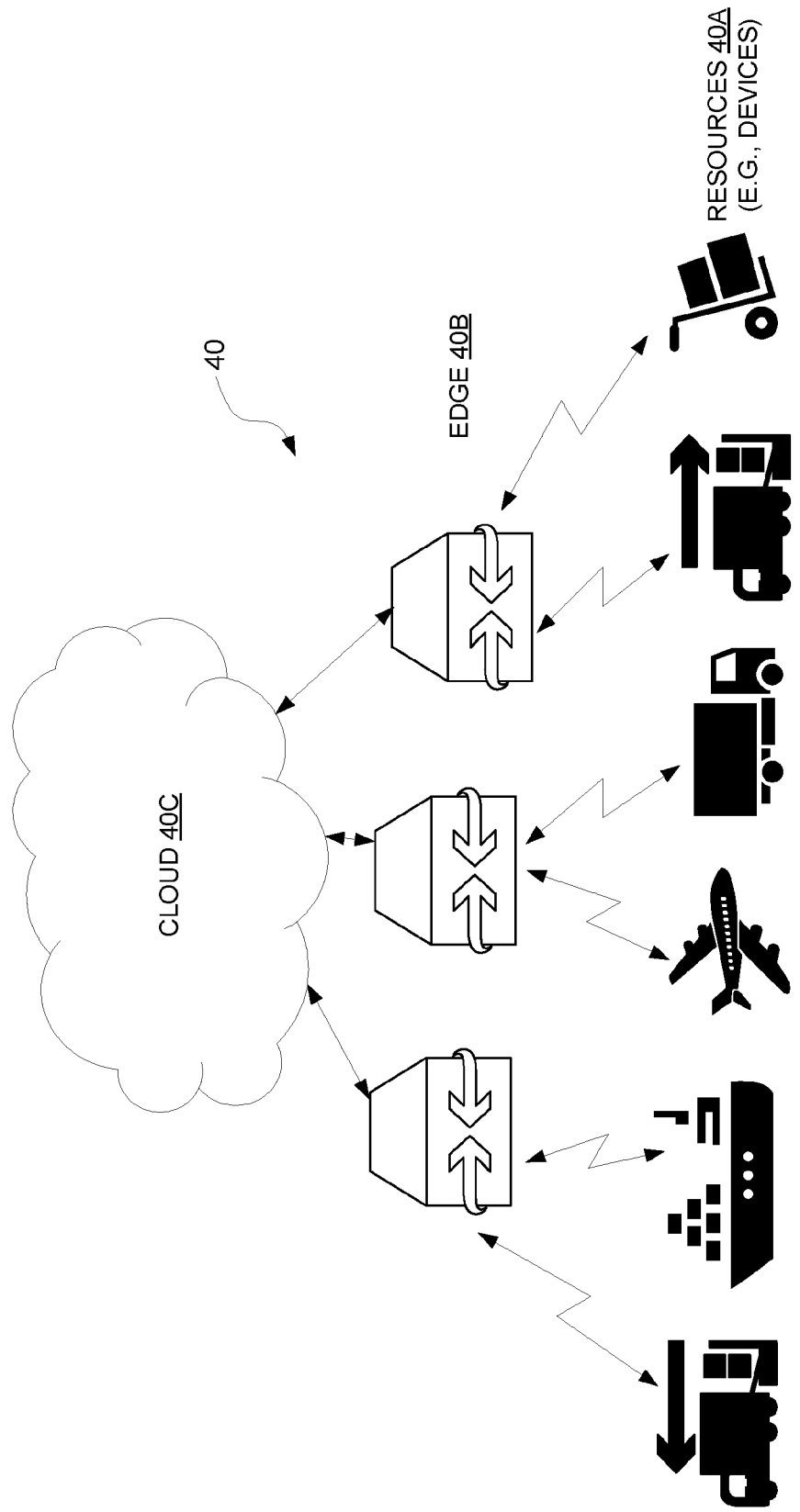
FIG. 6 is a block diagram of an internet-of-things system according to some embodiments.

Consider an example in which the embodiments above are combinable for synthesizing and executing a plan for accomplishing a task in an IoT system as shown in FIG. 6. In FIG. 6, an IoT system consists of a bottom layer 40A of IoT devices, a middle layer 40B of edge devices (e.g., gateways), and a top layer 40C of the cloud. The capabilities available at the IoT devices, edge devices, and cloud are available as (micro)services through server endpoints, e.g., a logic server may be available to access the microservices. The one or more IoT devices in this regard may expose their capabilities through IoT platforms, e.g., deployed on the edge or in the cloud. Other data and control related capabilities may exposed through (micro)services. It is common to have these higher-level capabilities in the cloud, but there is motivation to push these down to the edge and/or to the devices to have the computation near the data. In general, one can model the complete IoT system as a single system with different capabilities, some of which must be carried out on the device and some of which can be executed anywhere (device, edge, cloud).

Autonomous IoT systems are expected to accomplish specified tasks through the capabilities available in the IoT system. This involves automatic generation of plans (DAG of capabilities) and correct orchestration of the capabilities in the plan.

One approach to plan synthesis would be to assume that, during the time of plan synthesis, the state of the system is fixed and plan synthesis is idealized to be instantaneous. However, embodiments herein recognize that neither assumption holds in dynamic IoT scenarios. Plan synthesis takes time and the initial state that is assumed for synthesis might change during the time of plan synthesis, which invalidates the plan.

Moreover, correct execution of a plan requires resources (e.g., devices) that execute actions in the plan to send feedback to the dispatch controllers in terms of completion messages and timeouts to dispatch the next actions in the plan. Any unnecessary delay between two consecutive actions may result in failure of the plan. Where the actions are distributed to different dispatch controllers and have different feedback latency requirements, the underlying execution mechanism must support the variations.

The above problems may be especially present in systems that are real-time in nature. This may be the case in use cases such as: (i) service composition with device-level actuation services that change the state of the system in real time; (ii) logistics systems where resources (e.g. fuel) gets depleted and prompts new tasks such as refueling and replanning while vehicles are on the move (i.e. changing states) and (iii) robotic systems with similar characteristics such as in (ii).

Some embodiments herein generally address the problem with an approach in an AI planning system that assumes the distribution of actions is static and/or the neglect of system state changes during replanning.

Some embodiments address these problems in a context where plan synthesis engines and dispatch controllers (also referred to as execution units) are located at the device, edge, and cloud layers of the system. A machine learning (ML) module may learn and predict the values of predicates relevant to planning. These predicted values are used to predict a quiescent phase during which the predicates do not change values, indicating the time when planning can be performed. The duration of the quiescent phase may be used to set a constraint on plan generation time. Alternatively or additionally, once the plan is generated, the actions in the plan may be allocated to dispatch controllers (a.k.a. execution units) depending upon the dispatch latency times. The actions may be dependent upon modes and configurations, and hence reallocation may happen if the modes that affect actions' properties change.

Some embodiments advantageously enable correct planning even for real-time dynamic IoT systems. Alternatively or additionally, some embodiments enable correct real-time plan execution as per the synthesized plan. As a consequence of the above, AI planning based applications may be correctly executed for real-time IoT systems.

Figure 7:
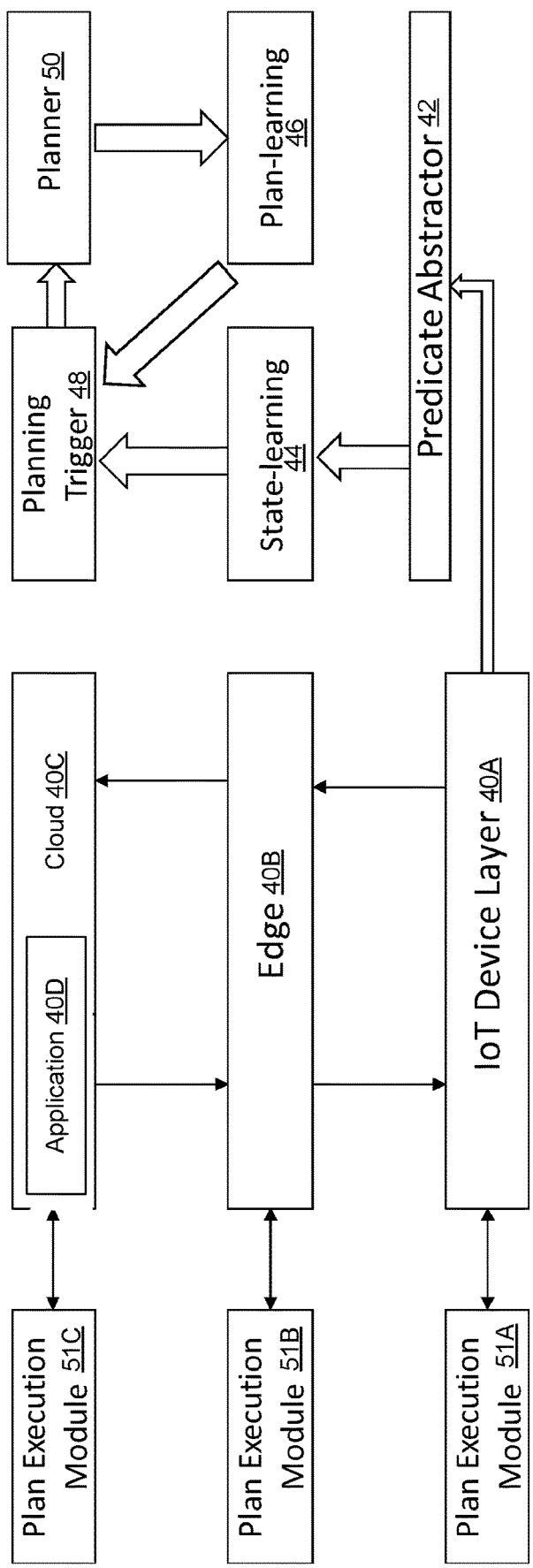
FIG. 7 is a block diagram of a system and a system-level controller according to some embodiments.

FIG. 7 illustrates an example for implementing the system-level controller 10 of FIG. 1 according to some embodiments in the context of an IoT system. As shown, a predicate abstractor module 42 accesses sensor values from the IoT devices in the IoT device layer 40A, and state variables from the upper-level microservices, and evaluates a set of predicates relevant to a task. This results in a timed binary signal for each predicate.

A state-learning module 44 is fed with the timed binary signal for each predicate and produces, e.g., through regression, a set of predicted signals for the future (e.g., up to a configured interval).

A plan-learning module 46 trains a model with the task, corresponding plans, and plan generation and execution times that have occurred so far. The plan-learning module 46 may estimate the time required for plan generation. It may also predict the relevant predicates, i.e., the predicates relevant for a task or plan.

Consider now a planning trigger module 48. When a task is requested by a user or an application 40D, or there is a trigger for replanning such as due to failure of current plan execution, the planning trigger module 48 takes as input the time (e.g., deadline) when the new plan should start executing. Within that time, the planning trigger module 48 uses the state-learning module 44 to identify a quiescent phase to trigger a planner 50 with the remaining time (or phase duration, whichever is minimum). The relevant predicates estimated by the plan-learning module 40 may be used to find one or more quiescent phases. In case such a quiescent phase of sufficient duration cannot be found, the planning trigger module 48 may request actions that will put the system in known states (called waypoints) that are, by definition, quiescent.

The planner module 50 takes the generation time duration and produces a plan. The task, plan, and actual generation time and the relevant predicates may be given to the plan-learning module for model update.

Once a plan is generated, each action is allocated to an execution control module, also referred to as a dispatch controller above. There are plan execution modules 51A-51C in this regard at each level, i.e., device 40A, edge 40B, and cloud 40C. For each action, there is a distance cost (latency) from its deployment point to the execution modules. The allocation may be performed taking into account the communication latencies shown in FIG. 8.

Figure 8:
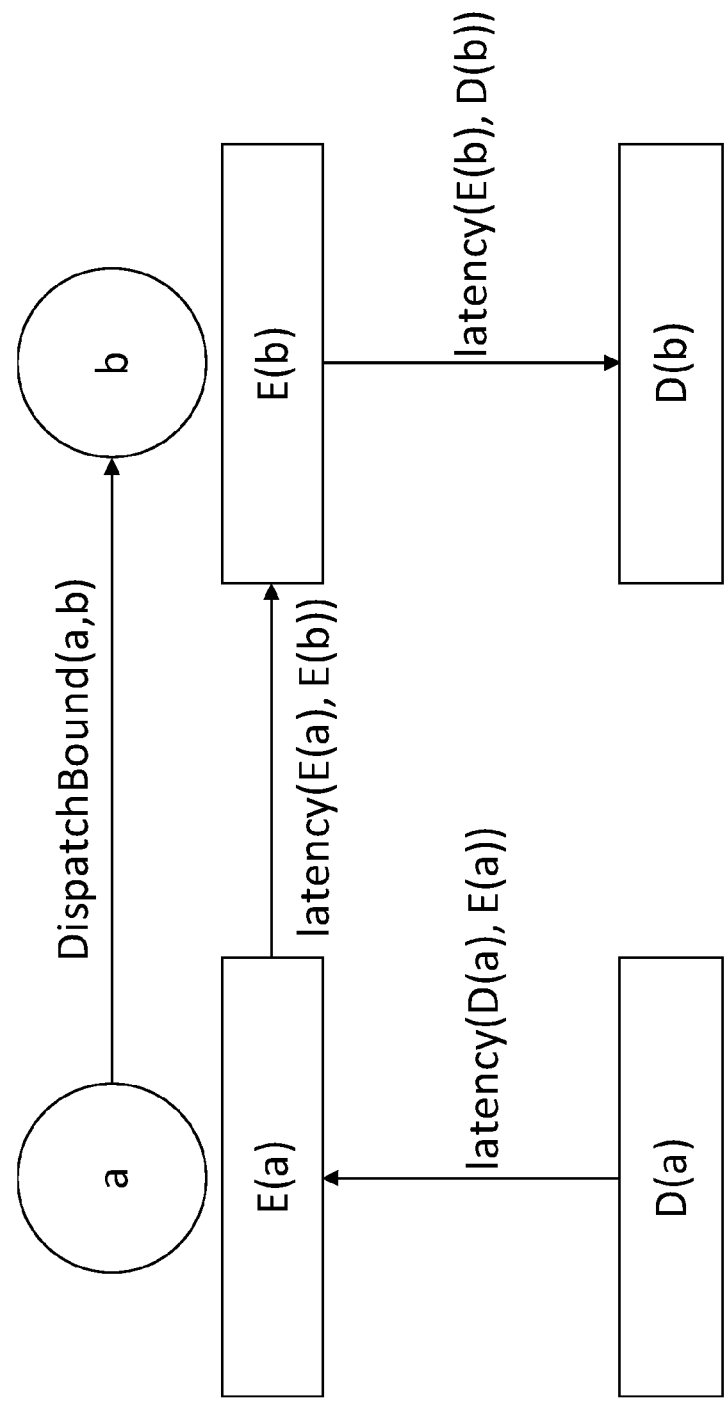
FIG. 8 is a block diagram of deployment modules and execution control modules, along with communication latencies therebetween, according to some embodiments.

In FIG. 8, D(a) is the deployment module where action "a" is actually executed. The deployment module may also be referred to as a resource above. Similarly, D(b) is the deployment module where action "b" is actually executed. Also in FIG. 8, E(a) is the execution control module that is responsible for the dispatch and control of action "a". And E(b) likewise is the execution control module that is responsible for the dispatch and control of action "b".

The term latency(D(a),E(a)) captures the latency of communication between D(a) and E(a). The term latency(E(a), E(b)) captures the latency of communication between E(a) and E(b). And the term latency (E(b), D(b)) captures the latency of communication between E(b) and D(b). The term DispatchBound(a,b) represents the dispatch delay bound that governs the bound on the delay in dispatching action "b" after action "a" completes execution.

To take into account these communication latencies, some embodiments allocate each action to an execution control module such that, for each pair of nodes <u,v> in the plan graph: latency(D(u), E(u))+latency(E(u), E(v))+latency(E(v), D(v))<=DispatchBound(u,v). The letters u and v denote actions in the plan graph. This ensures that when an action completes, the next action can be dispatched within the stipulated time.

It may appear that one can always prefer to allocate an action to an execution module which is closer to the device where the action can be execution. However, the middle term latency(E(a), E(b)) prevents all actions from being close to the respective deployment sites, because E(a) and E(b) may be far away from each other and hence the latency of communicating the completion message will incur extra cost.

One way to allocate the actions u to the execution control units (D(u)) and compute the above equation. Another way is to cast this as a linear programming problem, since the constraints are linear, and solve the optimization problem. For large plans, over time, some embodiments learn the right allocations from history and build tables that can provide near constant-time lookups.

Consider an example where the problem is cast as a set of integer linear programming constraints. Assume $x\_ij=1$, if action i is allocated to execution module j and 0, otherwise. Also assume that D(i), the deployment device for action i, is known. Also assume that DispatchBound(i, j) are known from the plan graph, and that L(s1, s2) are known for each pair of execution modules s1 and s2.

Then, for each edge <u, v> in the plan graph, some embodiments generate constraints:

$$L(D(u),j)*x\_um+L(m,n)*y\_mn+L(n,D(v))* \\ x\_vn<=DispatchBound(u,v), \quad\quad 1.$$

$$y\_mn>=x\_um+x\_vn-1 \quad\quad 2.$$

$$y\_mn<=x\_um \quad\quad 3.$$

$$y\_mn<=x\_vn \quad\quad 4.$$

$$0<=y\_mn<=1 \quad\quad 5.$$

for m=e1, . . . ek, n=e1, . . . ek, m!=n, where e1 to ek are all the execution modules.

The first constraint is a direct translation of the latency equation: latency(D(u), E(u))+latency(E(u), E(v))+latency(E(v), D(v))<=DispatchBound(u, v). The constraints 2-5 are a trick to capture the y_mn which is the AND of x_um and x_vn, through linear inequalities.

Figure 9:
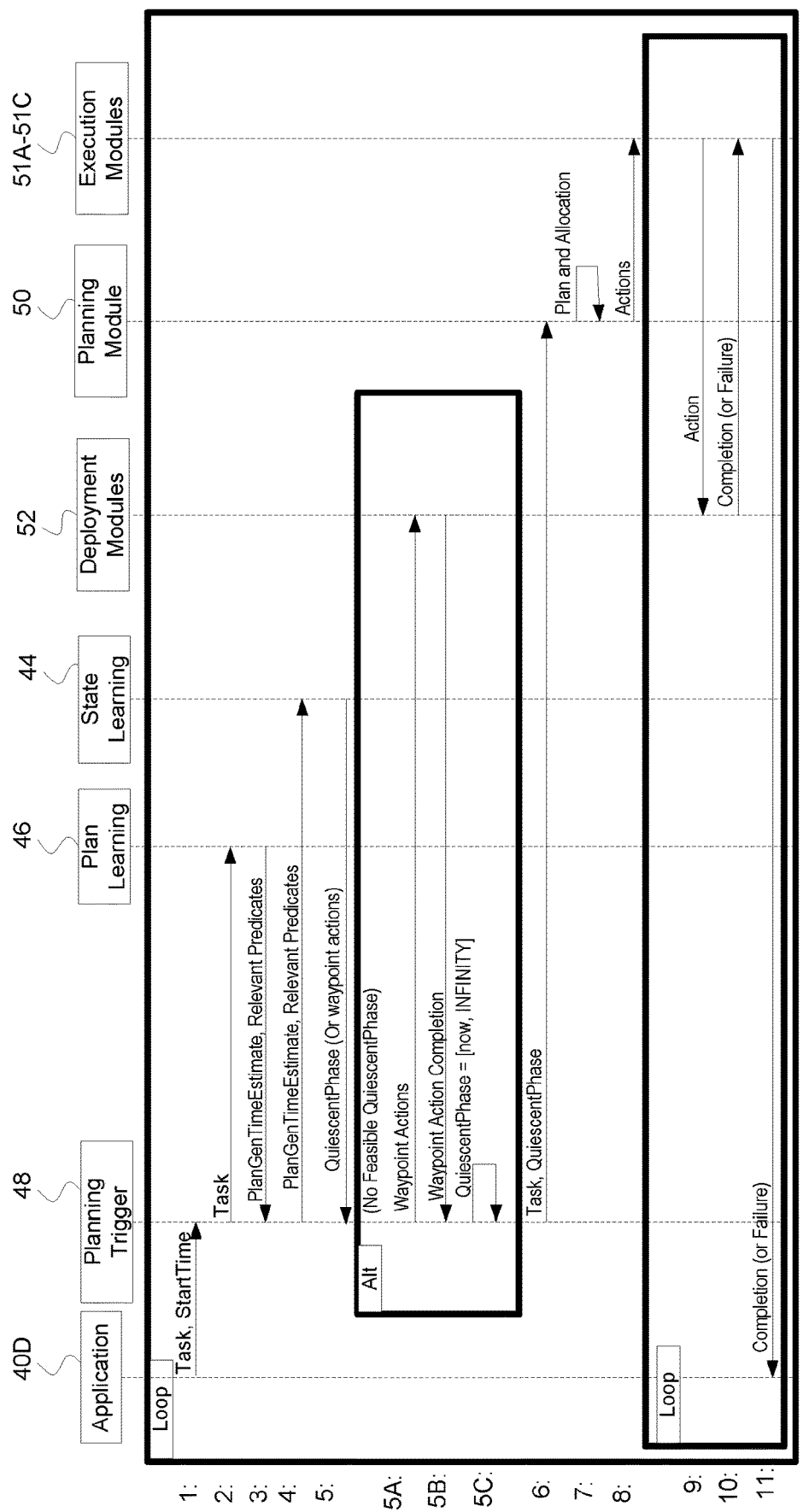
FIG. 9 is a call flow diagram for a sequence of messages between modules for plan generation and action dispatch according to some embodiments.

Regardless of the particular algorithm for allocating actions to execution control modules, consider now the example in FIG. 9 of a message and activity sequence according to some embodiments. As shown, in step 1, the messaging sequence is activated by a task request from an application 40D. It can be an independent application, a service, or a user interface through which a user specifies a task to be accomplished in the system. The request is accompanied by a start time by which the new task should start.

In step 2, the planning trigger module 48 queries the plan-learning module 46 for an estimate of the plan generation time and the relevant predicates for the task. In step 3, the planning trigger module 48 receives the requested information from the plan learning module 46.

In step 4, the planning trigger module 48 further queries the state-learning module 44 for a quiescent phase in which plan generation may be performed. The planning trigger module 48 may provide within this query the plan generation time estimate and the relevant predicates. The state-learning module may determine the quiescent phase based on a prediction of the values of the relevant predicates. In step 5, the planning trigger module 48 in response gets the quiescent phase, if there is any; otherwise the planning trigger module 48 receives a set of waypoint actions.

In step 5A, if there is no quiescent phase naturally possible for plan generation, and a set of waypoint actions are available, the planning trigger module 48 prompts execution of the waypoint actions by the deployment modules that execute those actions. In step 5B, the planning trigger module 48 may receive confirmation that the waypoint action(s) were completed. Note that there may be no need at this point to schedule the waypoint actions through execution control modules, since mostly the waypoint actions would be single actions without dependencies. As a result of the waypoint action(s) being executed, at step 5C, the system is in a quiescent phase that lasts forever, or at least until explicitly triggered to exit such a phase.

In step 6, the plan trigger module 49 calls the planning module 50 to generate a plan for the task in step 7. If a quiescent phase was identified as naturally occurring, this may mean the planning trigger module 49 waits for the quiescent phase to occur before calling the planning module 50 to generate the plan. As shown, in steps 7 and 8, the planning module 50 may also allocate actions in the plan to execution control modules deployed in different places, according to the algorithm described above.

In steps 9 and 10, the execution control modules 51A-51C sequentially dispatch the actions in the plan to the respective deployment modules, ensuring the dependencies in the plan and the preconditions in the actions.

In step 11, the execution control module allocated the last action in the plan may signal completion or failure of the task.

Note that this procedure is looped as needed to handle replanning. Indeed, every time there is a new plan, a reallocation procedure will be called, though it may retain the earlier allocations. The allocations, naturally, are dependent upon the generated plan graphs.

Also note that the modules described above may form at least part of the system-level controller 10 in FIG. 1. For example, in some embodiments, the AI planning controller 10A is realized by the planning trigger module 49. In this case, the AI planning controller 10A may determine the quiescent phase by receiving an indication of such a quiescent phase from the state-learning module 44. In one or more embodiments, the AI planning controller 10A may also include the plan-learning module 46 and/or the state-learning module 44.

Alternatively or additionally, in some embodiments, the dispatch allocation controller 10B may be realized by the planning module 50.

Note further that the AI planning controller 10A and/or the dispatch allocation controller 10B may be implemented on any equipment or node in, or in communication with, the system 12. This equipment or node may be deployed anywhere in the device, edge, or cloud layer, depending upon resource constraints. In fact, the AI planning controller 10A and/or the dispatch allocation controller 10B may be implemented in a distributed or virtualized fashion, e.g., so as to be implemented across multiple nodes.

Within this context, the system-level controller 10, AI planning controller 10A, and/or the dispatch allocation controller 10B may perform the methods herein and any other processing by implementing any functional means, modules, units, or circuitry. In one embodiment, for example, the system-level controller 10, AI planning controller 10A, and/or the dispatch allocation controller 10B comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more communications protocols as well as instructions for carrying out one or more of the techniques described herein, in several embodiments. In embodiments that employ memory, the memory stores program code that, when executed by the one or more processors, carries out the techniques described herein.

Figure 10:
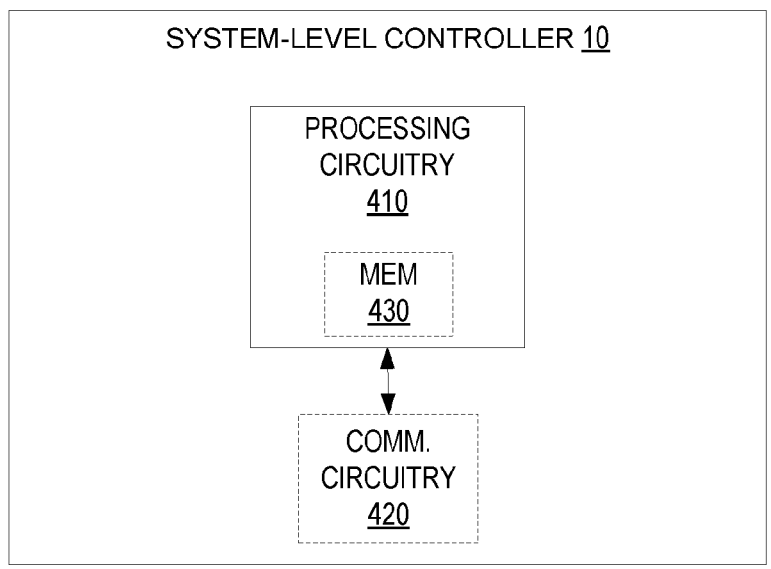
FIG. 10 is a block diagram of a system-level controller according to some embodiments.

FIG. 10 for example illustrates the system-level controller 10 as implemented in accordance with one or more embodiments. As shown, the system-level controller 10 includes processing circuitry 410. The system-level controller 10 may also include communication circuitry 420. In this case, the communication circuitry 420 is configured to transmit and/or receive information to and/or from one or more other nodes, e.g., via any communication technology. Regardless, the processing circuitry 410 is configured to perform processing described above, such as by executing instructions stored in memory 430. The processing circuitry 410 in this regard may implement certain functional means, units, or modules.

Figure 11A:
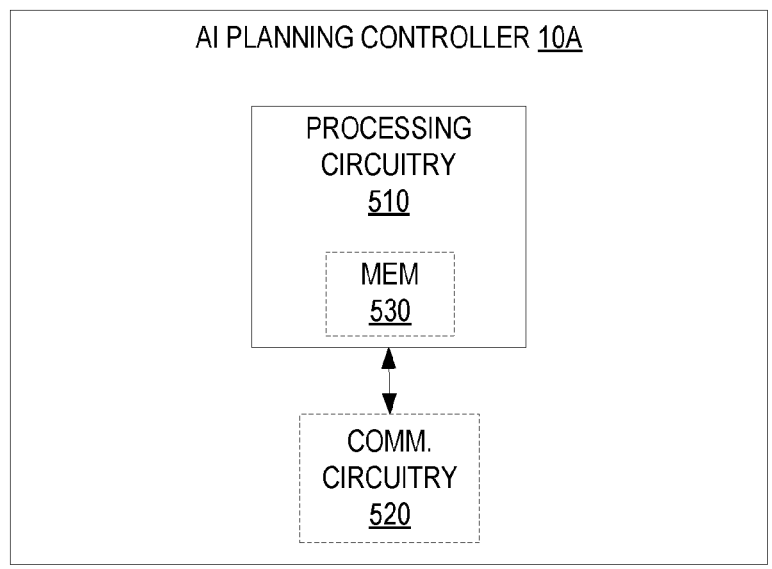
FIG. 11A is a block diagram of an AI planning controller according to some embodiments.

FIG. 11A illustrates the AI planning controller 10A as implemented in accordance with one or more embodiments. As shown, the AI planning controller 10A includes processing circuitry 510 and in some embodiments may also include communication circuitry 520. The communication circuitry 520 is configured to transmit and/or receive information to and/or from one or more other nodes, e.g., via any communication technology. The processing circuitry 510 is configured to perform processing described above (e.g., in FIG. 2 and/or 3), such as by executing instructions stored in memory 530. The processing circuitry 510 in this regard may implement certain functional means, units, or modules.

Figure 11B:
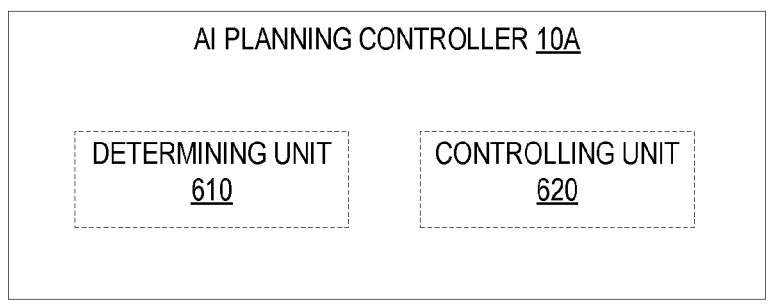
FIG. 11B is a block diagram of an AI planning controller according to other embodiments.

FIG. 11B illustrates a schematic block diagram of the AI planning controller 10A in according to still other embodiments. As shown, the AI planning controller 10A implements various functional means, units, or modules, e.g., via the processing circuitry 510 in FIG. 11A and/or via software code. These functional means, units, or modules, e.g., for implementing the method 200 in FIG. 3 herein, include for instance a determining unit 610 for determining a quiescent phase 20 during which values of at least some predicates (e.g., precondition predicates) describing a state of the system 12 will remain stable. Also included may be a controlling unit or module 620 for controlling artificial intelligence planning to synthesize the plan 16 during at least some of the quiescent phase 20.

Figure 12A:
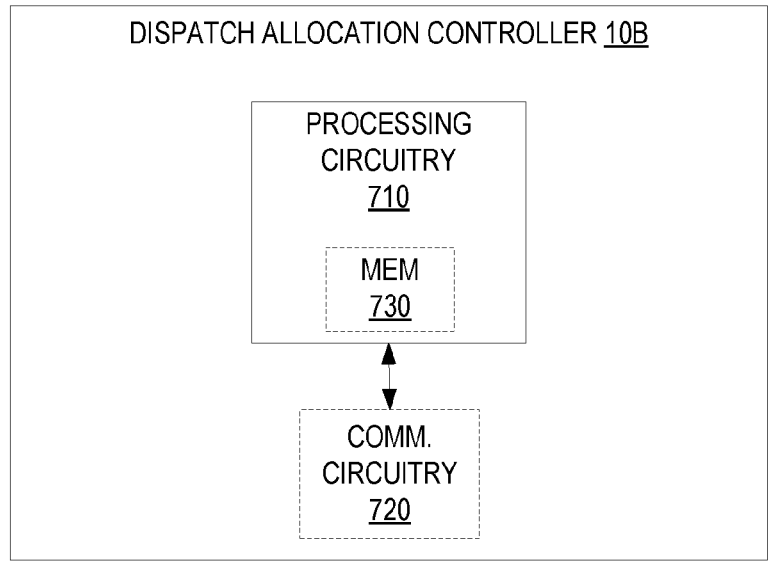
FIG. 12A is a block diagram of a dispatch allocation controller according to some embodiments.

FIG. 12A illustrates the dispatch allocation controller 10B as implemented in accordance with one or more embodiments. As shown, the dispatch allocation controller 10B includes processing circuitry 710 and in some embodiments may also include communication circuitry 720. The communication circuitry 720 is configured to transmit and/or receive information to and/or from one or more other nodes, e.g., via any communication technology. The processing circuitry 710 is configured to perform processing described above (e.g., in FIG. 5), such as by executing instructions stored in memory 730. The processing circuitry 710 in this regard may implement certain functional means, units, or modules.

Figure 12B:
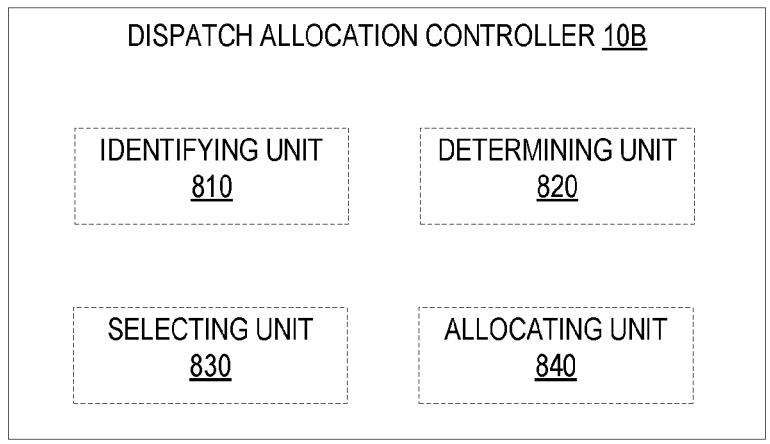
FIG. 12B is a block diagram of a dispatch allocation controller according to other embodiments.

FIG. 12B illustrates a schematic block diagram of the dispatch allocation controller 10B in according to still other embodiments. As shown, the dispatch allocation controller 10B implements various functional means, units, or modules, e.g., via the processing circuitry 710 in FIG. 12A and/or via software code. These functional means, units, or modules, e.g., for implementing the method 400 in FIG. 5 herein, include for instance an identifying unit or module 810 for identifying multiple candidate dispatch controllers that are candidates for controlling dispatch of a first action (e.g., action 18A) in the plan 16. Also included may be a determining unit or module 820 for determining, for each of the candidate dispatch controllers, a communication latency with which control signalling is able to be communicated via the candidate dispatch controller for dispatching a second action (e.g., action 18B) in the plan 16 after execution of the first action. Further included may be a selecting unit or module 830 for selecting, from among the candidate dispatch controllers, a first dispatch controller (e.g., Controller A) whose determined communication latency satisfies a dispatch delay constraint governing dispatch of the second action. In some embodiments, an allocating unit or module 840 may be included for allocating the first action to the first dispatch controller.

Those skilled in the art will also appreciate that embodiments herein further include corresponding computer programs.

A computer program comprises instructions which, when executed on at least one processor of the system-level controller 10, AI planning controller 10A, and/or the dispatch allocation controller 10B, cause the system-level controller 10, AI planning controller 10A, and/or the dispatch allocation controller 10B to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Note that although some embodiments herein are implemented for a system that is a cyber-physical system or an IoT system, other embodiments herein may be implemented for other types of systems. Generally, for instance, embodiments herein may be implemented for any system with atomic actions for which preconditions and effects are definable.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The invention claimed is:

1. A method of controlling when artificial intelligence planning synthesizes a plan to accomplish a task in a system that is an internet-of-things (IoT) system or a cyber-physical system, the method comprising:
   determining a quiescent phase during which values of at least some predicates describing a state of the system will remain stable; and
   controlling artificial intelligence planning to synthesize the plan during at least some of the quiescent phase;
   wherein said controlling comprises controlling the artificial intelligence planning to synthesize the plan as a set of basic or atomic actions to be executed by devices or resources in the system for accomplishing the task, wherein each basic or atomic action is defined by a pair of predicates which capture the state of the system before and after the basic or atomic action is executed, wherein the predicate which captures the state of the system before the basic or atomic action is executed is a precondition predicate and the predicate which captures the state of the system after the basic or atomic action is executed is an effect predicate; and
   wherein the quiescent phase is a phase during which values of the precondition predicates in the plan will remain stable.

2. The method of claim 1, wherein said controlling comprises delaying synthesis of the plan until at least some of the synthesis will occur during the quiescent phase, subject to a constraint that the task or the synthesis must start or end by a certain deadline.

3. The method of claim 1, further comprising, responsive to determining that no quiescent phase is predicted to naturally occur, driving the system into the quiescent phase by controlling execution of a set of one or more waypoint actions.

4. The method of claim 1, wherein the quiescent phase is a phase during which values of precondition predicates relevant to the task will remain stable, wherein determining the quiescent phase comprises predicting the quiescent phase based on predicted values of the precondition predicates relevant to the task.

5. The method of claim 1, wherein said controlling comprises controlling, based on a duration of the quiescent phase, a length of an interval over which the plan is to be synthesized.

6. A method of controlling the dispatch of actions in a plan for accomplishing a task in a system, the method comprising:
   identifying multiple candidate dispatch controllers that are candidates for controlling dispatch of a first action in the plan;
   determining, for each of the candidate dispatch controllers, a communication latency with which control signaling is able to be communicated via the candidate dispatch controller for dispatching a second action in the plan after execution of the first action;
   selecting, from among the candidate dispatch controllers, a first dispatch controller whose determined communication latency satisfies a dispatch delay constraint governing dispatch of the second action; and
   allocating the first action to the first dispatch controller.

7. The method of claim 6, wherein a first resource in the system is configured to execute the first action, and wherein the dispatch delay constraint specifies a maximum allowable delay between when the first resource completes execution of the first action and when a second resource in the system receives control signaling from a second dispatch controller indicating that the second action is to be executed.

8. The method of claim 6, wherein said determining comprises determining, for each of the candidate dispatch controllers, a communication latency metric indicating the communication latency with which control signaling is able to be communicated via the candidate dispatch controller for dispatching the second action, wherein the communication latency metric for each candidate dispatch controller is a function of:
a first communication latency between a first resource configured to execute the first action and the candidate dispatch controller that is to receive control signaling from the first resource indicating that the first resource has completed execution of the first action;
a second communication latency between the candidate dispatch controller and a second dispatch controller that is to receive control signaling from the candidate dispatch controller indicating that the second action is to be dispatched; and
a third communication latency between the second dispatch controller and a second resource that is to execute the second action responsive to receiving control signaling from the second dispatch controller indicating that the second action is to be executed.

9. The method of claim 8, wherein the communication latency metric is a sum of the first, second, and third communication latencies.

10. The method of claim 6, wherein said identifying, selecting, and allocating are performed as part of allocating pairs of consecutive actions in the plan to respective pairs of dispatch controllers such that each pair of dispatch controllers to which a pair of actions is allocated is able to dispatch control signaling for consecutive execution of the actions with communication latency that satisfies a dispatch delay constraint for the pair of actions.

11. An artificial intelligence (AI) planning controller for controlling when artificial intelligence planning synthesizes a plan to accomplish a task in a system that is an internet-of-things (IoT) system or a cyber-physical system, the AI planning controller comprising:
processing circuitry configured to:
determine a quiescent phase during which values of at least some predicates describing a state of the system will remain stable; and
control artificial intelligence planning to synthesize the plan during at least some of the quiescent phase, wherein the plan is synthesized as a set of basic or atomic actions to be executed by devices or resources in the system for accomplishing the task, wherein each basic or atomic action is defined by a pair of predicates which capture the state of the system before and after the basic or atomic action is executed, wherein the predicate which captures the state of the system before the basic or atomic action is executed is a precondition predicate and the predicate which captures the state of the system after the basic or atomic action is executed is an effect predicate; and
wherein the quiescent phase is a phase during which values of the precondition predicates in the plan will remain stable.

12. The AI planning controller of claim 11, wherein the processing circuitry is configured to control artificial intelligence planning by delaying synthesis of the plan until at least some of the synthesis will occur during the quiescent phase, subject to a constraint that the task or the synthesis must start or end by a certain deadline.

13. The AI planning controller of claim 11, wherein the processing circuitry is further configured to, responsive to determining that no quiescent phase is predicted to naturally occur, drive the system into the quiescent phase by controlling execution of a set of one or more waypoint actions.

14. The AI planning controller of claim 11, wherein the quiescent phase is a phase during which values of precondition predicates relevant to the task will remain stable, wherein the processing circuitry is configured to determine the quiescent phase by predicting the quiescent phase based on predicted values of the precondition predicates relevant to the task.

15. The AI planning controller of claim 11, wherein the processing circuitry is configured to control artificial intelligence planning by controlling, based on a duration of the quiescent phase, a length of an interval over which the plan is to be synthesized.

16. A dispatch allocation controller for controlling the dispatch of actions in a plan for accomplishing a task in a system, the dispatch allocation controller comprising:
processing circuitry configured to:
identify multiple candidate dispatch controllers that are candidates for controlling dispatch of a first action in the plan;
determine, for each of the candidate dispatch controllers, a communication latency with which control signaling is able to be communicated via the candidate dispatch controller for dispatching a second action in the plan after execution of the first action;
select, from among the candidate dispatch controllers, a first dispatch controller whose determined communication latency satisfies a dispatch delay constraint governing dispatch of the second action; and
allocate the first action to the first dispatch controller.

17. The dispatch allocation controller of claim 16, wherein a first resource in the system is configured to execute the first action, and wherein the dispatch delay constraint specifies a maximum allowable delay between when the first resource completes execution of the first action and when a second resource in the system receives control signaling from a second dispatch controller indicating that the second action is to be executed.

18. The dispatch allocation controller of claim 16, wherein said determining comprises determining, for each of the candidate dispatch controllers, a communication latency metric indicating the communication latency with which control signaling is able to be communicated via the candidate dispatch controller for dispatching the second action, wherein the communication latency metric for each candidate dispatch controller is a function of:
a first communication latency between a first resource configured to execute the first action and the candidate dispatch controller that is to receive control signaling from the first resource indicating that the first resource has completed execution of the first action;
a second communication latency between the candidate dispatch controller and a second dispatch controller that is to receive control signaling from the candidate dispatch controller indicating that the second action is to be dispatched; and
a third communication latency between the second dispatch controller and a second resource that is to execute the second action responsive to receiving control signaling from the second dispatch controller indicating that the second action is to be executed.

19. The dispatch allocation controller of claim 18, wherein the communication latency metric is a sum of the first, second, and third communication latencies.

20. The dispatch allocation controller of claim 16, wherein said identifying, selecting, and allocating are performed as part of allocating pairs of consecutive actions in the plan to respective pairs of dispatch controllers such that each pair of dispatch controllers to which a pair of actions is allocated is able to dispatch control signaling for consecutive execution of the actions with communication latency that satisfies a dispatch delay constraint for the pair of actions.

21. The method of claim 1, wherein determining the quiescent phase comprises predicting the quiescent phase based on predicted values of the precondition predicates in the plan, and wherein said controlling comprises:
   determining whether the quiescent phase is predicted to naturally occur by a certain deadline by which the task or the synthesis must start or end;
   if the quiescent phase is predicted to naturally occur by the certain deadline, delaying synthesis of the plan until at least some of the synthesis will occur during the quiescent phase; and
   if no quiescent phase is predicted to naturally occur by the certain deadline, driving the system into the quiescent phase by controlling execution of a set of one or more waypoint actions.

22. The AI planning controller of claim 11, wherein the processing circuitry is configured to determine the quiescent phase by predicting the quiescent phase based on predicted values of the precondition predicates in the plan, and wherein the processing circuitry is configured to control artificial intelligence planning by:
   determining whether the quiescent phase is predicted to naturally occur by a certain deadline by which the task or the synthesis must start or end;
   if the quiescent phase is predicted to naturally occur by the certain deadline, delaying synthesis of the plan until at least some of the synthesis will occur during the quiescent phase; and
   if no quiescent phase is predicted to naturally occur by the certain deadline, driving the system into the quiescent phase by controlling execution of a set of one or more waypoint actions.

23. The method of claim 6, wherein the system is an internet-of-things (IoT) system or a cyber-physical system, wherein the method further comprises controlling when artificial intelligence planning synthesizes a plan to accomplish the task in the system, by:
   determining a quiescent phase during which values of at least some predicates describing a state of the system will remain stable; and
   controlling artificial intelligence planning to synthesize the plan during at least some of the quiescent phase.

24. A system-level controller comprising the dispatch allocation controller of claim 16 and further comprising an artificial intelligence (AI) planning controller for controlling when artificial intelligence planning synthesizes a plan to accomplish the task in the system, wherein the system is an internet-of-things (IoT) system or a cyber-physical system, wherein the AI planning controller comprises:
   processing circuitry configured to:
      determine a quiescent phase during which values of at least some predicates describing a state of the system will remain stable; and
      control artificial intelligence planning to synthesize the plan during at least some of the quiescent phase.

* * * * *